(12) United States Patent
Shin et al.

(10) Patent No.: US 12,191,507 B2
(45) Date of Patent: Jan. 7, 2025

(54) BATTERY CELL

(71) Applicant: SK On Co., Ltd., Seoul (KR)

(72) Inventors: Jae Sik Shin, Daejeon (KR); Seung Hoon Ju, Daejeon (KR); Jae Gyu Byun, Daejeon (KR); Gi Jeong Seo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/447,301

(22) Filed: Aug. 10, 2023

(65) Prior Publication Data

US 2024/0079691 A1 Mar. 7, 2024

(30) Foreign Application Priority Data

Sep. 7, 2022 (KR) .................. 10-2022-0113656
May 31, 2023 (KR) .................. 10-2023-0070198

(51) Int. Cl.
| | |
|---|---|
| *H01M 50/14* | (2021.01) |
| *H01M 50/15* | (2021.01) |
| *H01M 50/528* | (2021.01) |
| *H01M 50/548* | (2021.01) |
| *H01M 50/627* | (2021.01) |
| H01M 50/103 | (2021.01) |

(52) U.S. Cl.
CPC ........... *H01M 50/14* (2021.01); *H01M 50/15* (2021.01); *H01M 50/528* (2021.01); *H01M 50/548* (2021.01); *H01M 50/627* (2021.01); H01M 50/103 (2021.01); Y02E 60/10 (2013.01)

(58) Field of Classification Search
CPC .. H01M 50/14; H01M 50/528; H01M 50/548; H01M 50/627; H01M 50/15; H01M 50/103; Y02E 60/10
See application file for complete search history.

(56) References Cited

U.S. PATENT DOCUMENTS

| | | | |
|---|---|---|---|
| 2011/0117421 A1 | 5/2011 | Kim et al. | |
| 2014/0170473 A1* | 6/2014 | Roh ................. | H01M 10/0566 429/185 |
| 2016/0043374 A1* | 2/2016 | Seong ............... | H01M 50/474 429/143 |
| 2021/0074961 A1* | 3/2021 | Zhou ................. | H01M 50/103 |

FOREIGN PATENT DOCUMENTS

| | | |
|---|---|---|
| KR | 10-1137363 B2 | 4/2012 |
| KR | 10-2013-0092800 A | 8/2013 |
| KR | 10-2018-0067323 A | 6/2018 |

* cited by examiner

*Primary Examiner* — Lingwen R Zeng
(74) *Attorney, Agent, or Firm* — IP & T GROUP LLP

(57) ABSTRACT

A battery cell includes an electrode assembly in which a plurality of electrode plates are stacked; a protective assembly disposed on at least one side of the electrode assembly and including an insulating material; and a case having an internal space in which the electrode assembly is accommodated, wherein the protective assembly includes a through-hole configured to allow electrolyte to pass therethrough.

14 Claims, 10 Drawing Sheets

BATTERY CELL

CROSS-REFERENCE TO RELATED APPLICATION(S)

This application claims benefit of priority to Korean Patent Application No. 10-2023-0070198 on May 31, 2023 and Korean Patent Application No. 10-2022-0113656 filed on Sep. 7, 2022 in the Korean Intellectual Property Office, the disclosures of which are incorporated herein by reference in their entirety.

BACKGROUND

1. Field

The technology and implementations disclosed in this patent document generally relate to a battery cell.

2. Description of Related Art

A secondary battery (a battery cell) may be easily charged and discharged, differently from a primary battery, and has received a great deal of attention as a power source for various mobile devices and electric vehicles.

Such a secondary battery may have a structure in which an electrode assembly formed by stacking a positive electrode plate, a negative electrode plate, and a separator or being wound in a form of roll is accommodated in a case.

When an impact is applied to a battery cell, the impact may be transmitted to an electrode assembly in the battery cell and may damage the electrode assembly. Also, as the electrode assembly is damaged, a short circuit may occur with an internal side surface of a case, causing abnormal operation of the battery cell.

Accordingly, it may be necessary to develop a structure which may protect the electrode assembly from external impacts and may stably maintain an electrical connection between the electrode assembly and a terminal portion of the battery cell.

SUMMARY

The disclosed technology may be implemented in some embodiments to provide a battery cell having a protective structure which may protect an electrode assembly.

The disclosed technology may be implemented in some embodiments to provide a battery cell having a protective structure having a structure which may not interfere with electrolyte injection.

The disclosed technology may be implemented in some embodiments to provide a battery cell may increase energy density through a simplified connection structure between an electrode assembly and a terminal portion of a battery cell.

The disclosed technology may be implemented in some embodiments to provide a battery cell which may simplify an assembly process.

In some embodiments of the disclosed technology, a battery cell includes an electrode assembly in which a plurality of electrode plates are stacked; a protective assembly disposed on at least one side of the electrode assembly and including an insulating material; and a case having an internal space in which the electrode assembly is accommodated, wherein the protective assembly includes a through-hole configured to allow electrolyte to pass therethrough.

The battery cell may further include one or more cap assemblies coupled to the case and closing the internal space, wherein the one or more cap assemblies include an electrolyte injection port configured to allow the electrolyte to be injected.

The through-hole of the protective assembly may be disposed to oppose the electrolyte injection port provided in the one or more cap assemblies.

The protective assembly may include a protective frame disposed to oppose the one or more cap assemblies.

The through-hole may be configured to extend from one surface of the protective frame to the other surface of the protective frame.

The protective frame may include a body portion opposing the electrode assembly in a first direction; and one or more bent portions extending from the body portion and opposing the electrode assembly in a second direction perpendicular to the first direction.

The through-hole may be disposed in the body portion and opposes the electrolyte injection port in the first direction.

The one or more bent portions may include a first bent portion and a second bent portion spaced apart from each other, and at least a portion of the electrode assembly is disposed between the first bent portion and the second bent portion.

The case may include a first opening and a second opening spaced apart from each other, and the one or more cap assemblies may include a first cap assembly closing the first opening and a second cap assembly closing the second opening.

In some embodiments of the disclosed technology, a battery cell includes an electrode assembly in which a plurality of electrode plates are stacked; a case having an internal space in which the electrode assembly is accommodated; a cap assembly coupled to the case and having a terminal portion disposed thereon; and a protective assembly disposed between the electrode assembly and the cap assembly and protecting the electrode assembly, wherein the protective assembly covers at least one side edge of the electrode assembly.

The protective assembly may include a protective frame disposed to oppose the cap assembly and including an insulating material.

The protective frame may include a body portion opposing the electrode assembly in a first direction; and one or more bent portions connected to the body portion and opposing the electrode assembly in a second direction perpendicular to the first direction.

The body portion of the protective frame may include a through-hole through which the electrolyte solution passes.

The cap assembly may include a cap plate including an electrolyte injection port, and the through-hole of the protective frame is disposed to oppose the electrolyte injection port.

The protective assembly may further include a current collecting member coupled to the protective frame and electrically connected to the electrode assembly.

The protective assembly may further include a connection member electrically connected to each of the current collecting member and the terminal portion, and at least a portion of the connection member is inserted into the terminal portion.

In some embodiments of the disclosed technology, an energy storage device including an electrode assembly in which a plurality of electrode plates are stacked; a protective assembly disposed on at least one side of the electrode assembly and including an insulating material; and a case having an internal space in which the electrode assembly is accommodated, wherein the protective assembly includes a plurality of battery cells including through-holes configured to allow electrolyte to pass therethrough, and the plurality of battery cells are electrically connected to each other.

The energy storage device may further include one or more cap assemblies coupled to the case and closing the internal space, and the one or more cap assemblies are configured to allow the electrolyte to be injected and include an electrolyte injection port provided to oppose the through-hole.

The protective assembly may include a protective frame disposed to oppose the one or more cap assemblies.

In some embodiments of the disclosed technology, an energy storage device including an electrode assembly in which a plurality of electrode plates are stacked; a case having an internal space in which the electrode assembly is accommodated; a cap assembly coupled to the case and having a terminal portion disposed thereon; and a protective assembly placed between the electrode assembly and the cap assembly to protect the electrode assembly, the protective assembly includes a plurality of battery cells covering at least one side edge of the electrode assembly, and the plurality of battery cells are electrically connected to each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
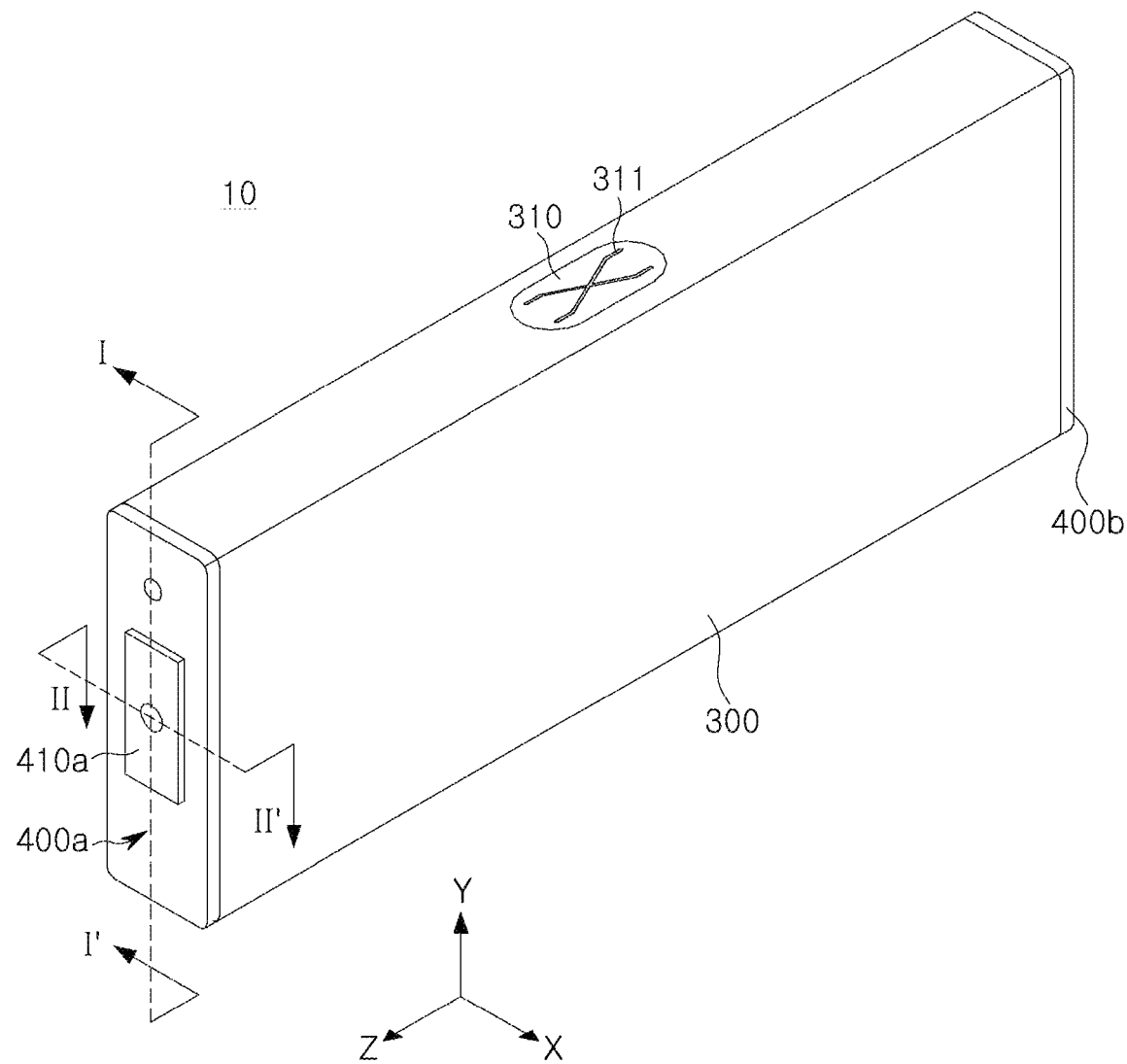
FIG. 1 is a perspective diagram illustrating a battery cell according to an embodiment of the present disclosure.

Features of the disclosed technology disclosed in this patent document are described by embodiments with reference to the accompanying drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by same reference numerals. Also, redundant descriptions and detailed descriptions of known functions and elements which may unnecessarily make the gist of the present disclosure obscure will not be provided. In the accompanying drawings, a portion of elements may be exaggerated, omitted or briefly illustrated, and the sizes of the elements do not necessarily reflect the actual sizes of these elements.

The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the description below, the terms "upper side," "upper portion," "lower side," "lower portion," "side surface," "front surface," "rear surface," and the like may be denoted with respect to the directions in the drawings, and when the direction of a component is changed, the directions may be represented differently.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

In the drawings, same elements will be indicated by same reference numerals. Also, redundant descriptions and detailed descriptions of known functions and elements that may unnecessarily make the gist of the present disclosure obscure will not be provided. In the accompanying drawings, some elements may be exaggerated, omitted or briefly illustrated, and the sizes of the elements do not necessarily reflect the actual sizes of these elements.

FIG. 1 is a perspective diagram illustrating a battery cell 10 according to an embodiment.

Figure 2:
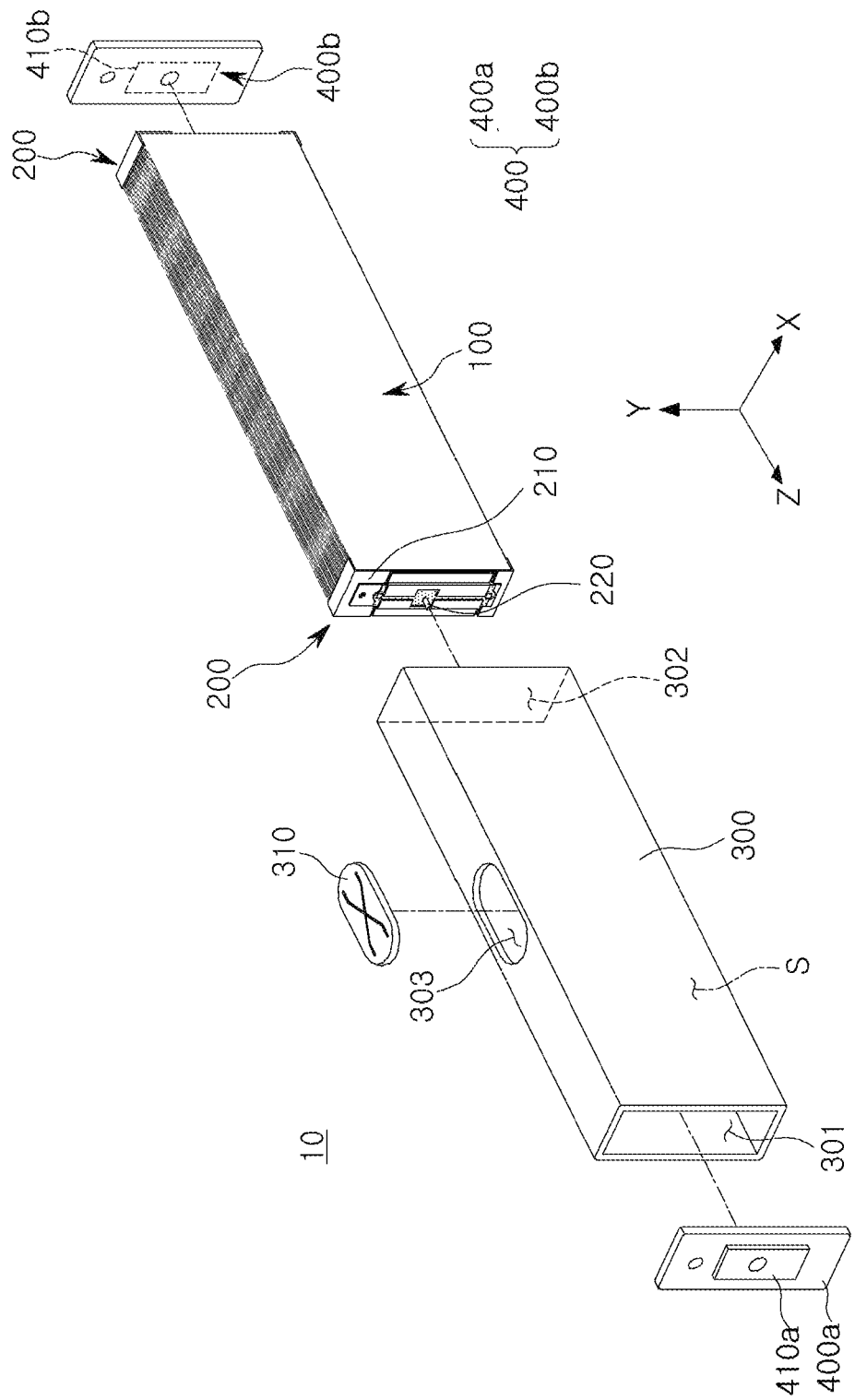
FIG. 2 is an exploded perspective diagram illustrating a battery cell according to an embodiment of the present disclosure.

FIG. 2 is an exploded perspective diagram illustrating a battery cell 10 according to an embodiment.

In embodiments, the battery cell 10 may be configured as a secondary battery which may be charged and discharged. The battery cell 10 may be configured as a secondary battery having an angular exterior shape as illustrated in FIGS. 1 and 2, but the specific exterior is not limited to the example illustrated in the drawings. For example, the battery cell may be configured as a cylindrical secondary battery or a pouch-type secondary battery.

In embodiments, the battery cell 10 may include an electrode assembly 100, a case 300 having an internal space in which the electrode assembly 100 is accommodated, and one or more cap assemblies coupled to the case 300 and closing the internal space of the case 300.

The electrode assembly 100 may include a plurality of electrode plates and a separator disposed between the electrode plates. For example, the plurality of positive electrode plates, the plurality of negative electrode plates and one or more separators of the electrode assembly 100 may be stacked in one direction. Alternatively, the electrode assembly 100 may have a jelly roll structure in which the positive electrode plate, the negative electrode plate, and the separator interposed therebetween are wound.

In embodiments, the battery cell 10 may include one or more electrode assemblies 100. When the battery cell 10 has a plurality of electrode assemblies, the electrode assemblies may be stacked and disposed in one direction (e.g., an X-axis direction).

A case 300 may have an internal space S for accommodating the electrode assembly 100 and an electrolyte solution (not illustrated).

The case 300 may include a material having sufficient rigidity to protect the electrode assembly 100 therein and to maintain an exterior shape of the entire battery cell 10. For example, at least a portion of case 300 may be formed of a metal material such as aluminum, iron, or stainless steel. However, the material of the case 300 is not limited thereto, and may be formed of a material having strength to maintain the exterior shape of the battery cell 10 and to protect the internal electrode assembly.

The case 300 may have an internal space S and may have a shape in which at least one side is open. For example, referring to FIGS. 1 and 2, the case 300 may have a hexahedral shape in which a first opening 301 and a second opening 302 are formed on both ends in the length direction (e.g., Z-axis direction). The internal space S may be formed between the first opening 301 and the second opening 302, and the electrode assembly 100 may be accommodated in the internal space S.

In the description below, embodiments will be described on the premise that the case 300 has a hexahedral shape with both sides open as illustrated in FIG. 2. However, the specific shape of the case 300 is not limited to the example illustrated in the drawings. The case 300 may be configured in any shape as long as the internal space S in which the electrode assembly 100 may be inserted and accommodated is secured. For example, the case may have the shape of a cylinder with an open upper surface or an open lower surface, or a polyhedral shape having at least one open side.

In embodiments, battery cell 10 may include one or more cap assemblies 400a and 400b coupled to the case 300. For example, referring to FIG. 2, a first cap assembly 400a and a second cap assembly 400b may be coupled to the first opening 301 and the second opening 302 of the case 300, respectively, and may close the internal space S of the case 300.

The cap assemblies 400a and 400b may include cap plates 420a and 420b coupled to the case 300 and terminal portions 410a and 410b disposed on the cap plates 420a and 420b, respectively.

The terminal portions 410a and 410b may be electrically connected to the electrode assembly 100 in the case 300. The electrode assembly 100 may be electrically connected to other components (e.g., conductive busbar) disposed externally of the battery cell 10 through the terminal portions 410a and 410b.

The terminal portions 410a and 410b may be fixed to the cap plates 420a and 420b. The cap plates 420a and 420b may be coupled to the case 300 and may form at least one side surface of the battery cell 10.

The cap plates 420a and 420b may include a material having a predetermined degree of rigidity such that the cap plates 420a and 420b may close one open side of the case 300 and may protect the electrode assembly 100 disposed in the internal space S. For example, at least a portion of the cap plates 420a and 420b may be formed of the same material as that of the case 300.

The cap assemblies 400a and 400b may be welded to the case 300. For example, while the cap plates 420a and 420b of the cap assemblies 400a and 400b cover the openings 301 and 302 of the case 300, portions of the cap plates 420a and 420b in contact with the case 300 may be coupled to the case 300 by laser welding. However, the method of coupling the cap assemblies 400a and 400b to the case 300 is not limited to the above example.

In a battery cell 10, a plurality of the cap assemblies 400a and 400b may be provided. For example, the cap assemblies 400a and 400b may include a first cap assembly 400a and a second cap assembly 400b in which a first terminal portion 410a and a second terminal portion 410b having opposite polarities are disposed, respectively.

As illustrated in FIGS. 1 and 2, the first cap assembly 400a and the second cap assembly 400b may be coupled to both ends of the case 300. For example, the first cap assembly 400a may have a first terminal portion 410a, which is a negative terminal, and may be coupled and welded to the first opening 301 of the case 300 and may close the first opening 301. The second cap assembly 400b may have a second terminal portion 410b which is a positive terminal, and may be coupled and welded to the second opening 302 of the case 300 and may close the second opening 302. Accordingly, the first cap assembly 400a and the second cap assembly 400b may close both sides of the case 300 in which the electrode assembly 100 is accommodated.

A laser welding method may be applied to the coupling between the cap assembly 400 and the case 300, but a specific coupling method is not limited thereto.

The position of the cap assembly 400 is not limited to the examples illustrated in FIGS. 1 and 2. For example, differently from the examples illustrated in FIGS. 1 and 2, the plurality of cap assemblies 400a and 400b in the battery cell 10 may be disposed on the same both side surfaces of the case 300.

The battery cell 10 may include a protective assembly 200 disposed on at least one side of the electrode assembly 100 and may protect the electrode assembly 100.

The protective assembly 200 may include a protective frame 210 configured to protect the electrode assembly, and a connection member 220 electrically connecting the electrode assembly 100 to the terminal portions 410a and 410b.

The protective assembly 200 may be disposed on the side opposing the cap assembly in the electrode assembly, and may electrically connect the terminal portion of the electrode assembly and the cap assembly while protecting the electrode assembly. For example, the protective frame 210 of the protective assembly 200 may include a material for absorbing impact and may prevent the electrode assembly from being damaged by an impact applied to the battery cell, and the connection member 220 of the protective assembly 200 may include a conductive metal material, and may electrically connect the terminal portion of the electrode assembly to the cap assembly.

Also, the protective frame 210 may include an insulating material, thereby preventing an electrode assembly and a case from being unintentionally shorted.

When an impact is applied to the battery cell, there may be a risk that the edge portion of the electrode assembly and the case may collide with each other and may be damaged, and accordingly, a short circuit may occur between the edge portion of the electrode assembly and the case. To prevent this, the protective frame 210 may be configured to cover at least one side edge of the electrode assembly. For example, the upper end and lower end of the protective frame 210 may be disposed to surround the upper end edge and the lower end edge of the electrode assembly, thereby absorbing impacts applied to the battery cell and protecting the edge of the electrode assembly.

The connection member 220 of the protective assembly 200 may be configured such that at least a portion may be inserted into the cap assembly 400. For example, the connection member 220 may be provided in the form of a pin structure protruding in a direction toward the cap assembly, and may be inserted into and in contact with the terminal portions 410a and 410b of the cap assembly 400. Accordingly, the electrode assembly 100 may be electrically connected to the terminal portions 410a and 410b of the cap assembly 400 through the connection member 220.

In the battery cell 10, a plurality of protective assemblies 200 may be provided. For example, referring to FIG. 2, the protective assembly 200 may be arranged to cover one side opposite to the cap assembly and the other side opposite to one side in the electrode assembly.

The cap assembly 400 may be configured to be assembled in the opening of the case 300 in the first direction (Z-axis direction), and the connection unit may be disposed to oppose the cap assembly 400 in the first direction (Z-axis direction). At least a portion of the connection member 220 may extend in a first direction such that the cap assembly 400 may be naturally inserted into the terminal portions 410a and 410b while being coupled to the case 300.

According to the battery cell 10 in the embodiment, since the terminal portions 410a and 410b and the electrode assembly 100 may be naturally connected to each other while the cap assembly 400 and the case 300 are assembled, the process of connecting the electrode assembly 100 to the terminal portions 410a and 410b may be simplified, which may be advantageous. Also, since at least a portion of the connection member 220 is inserted into the terminal portions 410a and 410b in the battery cell 10 according to the embodiments, space wasted for connecting the electrode assembly 100 to the terminal portions 410a and 410b may be reduced, thereby reducing energy density.

The battery cell 10 may further include a vent member 310 configured to discharge gas generated in the internal space S. The vent member 310 may be opened earlier than the other region of the battery cell 10 when the internal pressure of the battery cell 10 is higher than the predetermined pressure, thereby preventing the battery cell 10 from exploding.

The vent member 310 may be coupled to the case 300. For example, the vent member 310 may be coupled to a venting hole 303 formed on both side surfaces of the case 300.

The vent member 310 may be configured to be coupled to the venting hole 303 and may close the venting hole 303. When the internal pressure of case 300 is lower than the predetermined pressure, the vent member 310 may be configured to seal the venting hole 303, thereby preventing foreign materials from entering the battery cell 10 through the venting hole 303 or the electrolyte in the battery cell 10 from flowing out.

When gas is generated in the internal space S of case 300 while the battery cell 10 is repeatedly charged and discharged, such that the internal pressure increases higher than a predetermined pressure, at least a portion of the vent member 310 may be configured to be broken. For example, a notch portion 311 having a thickness smaller than those of other portions may be formed on the vent member 310. When the internal pressure of case 300 is higher than the predetermined pressure, the notch portion 311 may be preferentially broken in the vent member 310, and the gas in the internal space S may be discharged from the battery cell 10 through the broken notch portion 311.

Hereinafter, the cap assembly 400 included in the battery cell 10 will be described in detail with reference to FIGS. 3 and 4.

Figure 3:
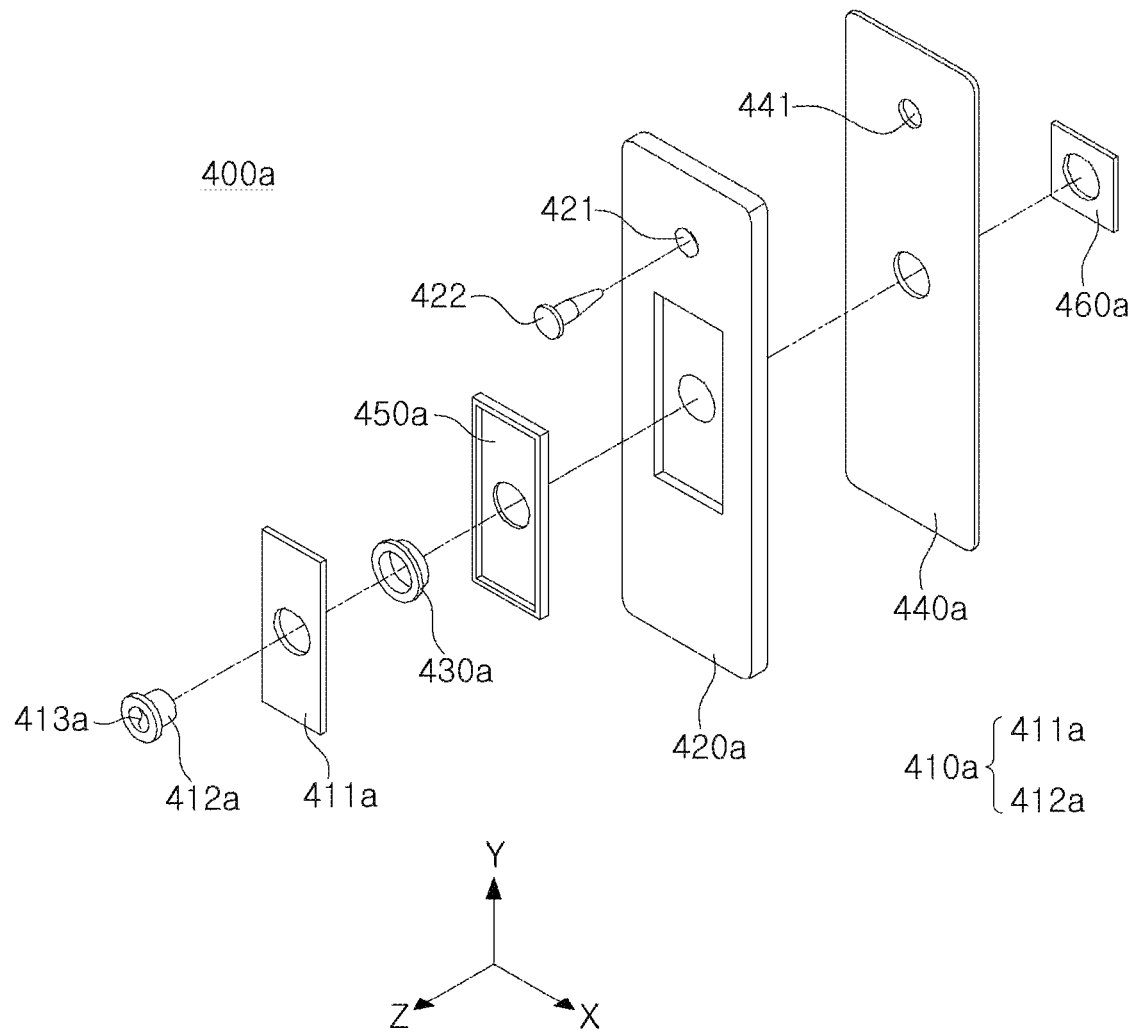
FIG. 3 is an exploded perspective diagram illustrating a first cap assembly according to an embodiment of the present disclosure.

FIG. 3 is an exploded perspective diagram illustrating a first cap assembly 400a according to an embodiment.

Figure 4:
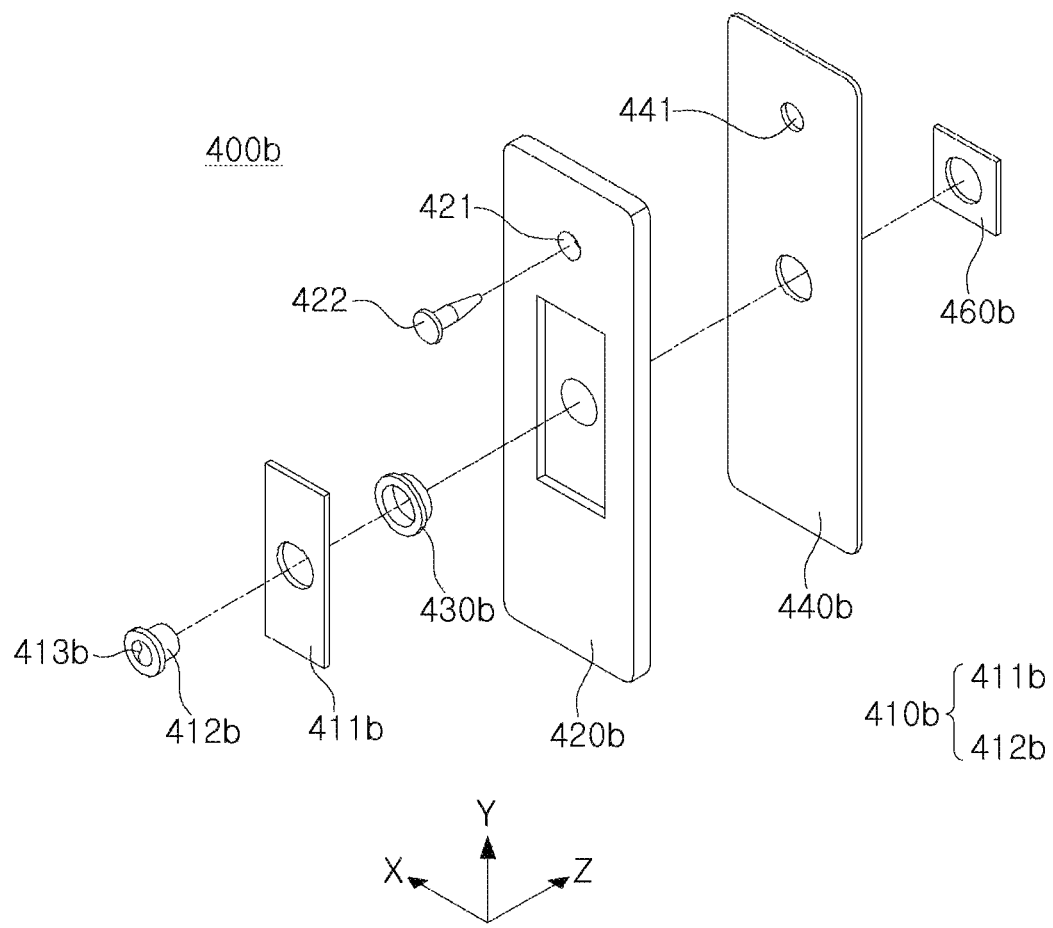
FIG. 4 is an exploded perspective diagram illustrating a second cap assembly according to an embodiment of the present disclosure.

FIG. 4 is an exploded perspective diagram illustrating a second cap assembly 400b according to an embodiment.

Since the cap assemblies 400a and 400b described with reference to FIGS. 3 and 4 may correspond to the cap assemblies 400a and 400b described in the aforementioned example embodiment with reference to FIGS. 1 and 2, overlapping descriptions may not be provided.

The first cap assembly 400a may include a first terminal portion 410a electrically connected to the electrode assembly 100 and a first cap plate 420a supporting the first terminal portion 410a. Also, the first cap assembly 400a may further include a first terminal insulator 450a and a first gasket 430a electrically separating the first terminal portion 410a and the first cap plate 420a from each other. Also, the first cap assembly 400a may further include a first cap insulator 440a for preventing the first cap plate 420a from directly shorting the electrode assembly 100.

The first terminal portion 410a of the first cap assembly 400a may include a first terminal unit 411a and a first rivet 412a.

The first terminal unit 411a may be disposed on the first cap plate 420a and may work as a connection terminal electrically connecting the battery cell 10 to an external component (e.g., a conductive busbar). To this end, the first terminal unit 411a may be provided as a plate-shaped member formed of a conductive metal such as aluminum or aluminum alloy. However, the material of the first terminal unit 411a is not limited to aluminum.

The first rivet 412a may be coupled to the first terminal unit 411a. For example, the first rivet 412a may penetrate through the first terminal unit 411a and may be riveted to the first terminal unit 411a. Also, the first rivet 412a and the first terminal unit 411a may be coupled to each other by laser welding.

The first rivet 412a may pass through both the first terminal unit 411a and the first cap plate 420a, and an end thereof may be disposed to oppose one side of the electrode assembly 100.

The first rivet 412a may include a first insertion hole 413a configured to allow the connection member 220 to be inserted. The first insertion hole 413a may have a shape of a hole penetrating through the first rivet 412a. The connection member 220 may be inserted and bonded to the first insertion hole 413a of the first rivet 412a and may be electrically connected to the first rivet 412a.

The first rivet 412a may be formed of a material different from that of the first terminal unit 411a. For example, the first terminal unit 411a may be formed of aluminum or an aluminum alloy, and the first rivet 412a may be formed of copper or a copper alloy. However, the first rivet 412a may be formed of the same material as that of the first terminal unit 411a.

The first cap plate 420a may be coupled to the case 300 and may support the first terminal portion 410a.

The first cap plate 420a may be configured to close the first opening 301 of the case 300. For example, the first cap plate 420a may be provided as a plate-shaped member, may be bonded to the case 300 by laser welding or ultrasonic welding and may close the first opening 301. For ease of welding, the first cap plate 420*a* may be formed of the same material as that of the case 300. For example, both the first cap plate 420*a* and the case 300 may be formed of aluminum or aluminum alloy. However, the material included in the first cap plate 420*a* is not limited to the above example, and may be formed of any material which may close the first opening 301 of the case 300 and may stably protect the internal components thereof.

When the first cap plate 420*a* includes a conductive material, insulating members formed of an insulating material may be disposed between the first terminal portion 410*a* and the first cap plate 420*a* such that the first terminal portion 410*a* and the first cap plate 420*a* may be electrically separated from each other. For example, referring to FIG. 3, a first gasket 430*a* to which a first terminal insulator 450*a* and a first rivet 412*a* are inserted and disposed on a rear surface of a first terminal unit 411*a* may correspond to the insulating member.

The first terminal insulator 450*a* may include an insulating material (e.g., polymer), may be disposed between the first terminal unit 411*a* and the first cap plate 420*a* and may insulate the first terminal unit 411*a* and the first cap plate 420*a* from each other.

The first gasket 430*a* may include an insulating material (e.g., polymer), may be disposed between the first rivet 412*a* and the first cap plate 420*a* and may insulate the first rivet 412*a* and the first cap plate 420*a* from each other. The first gasket 430*a* may be disposed to surround the first rivet 412*a* and may block the gap between the first rivet 412*a* and the first cap plate 420*a*, such that foreign materials outside the battery cell 10 may be prevented from entering a gap or the electrolyte in the battery cell 10 may be prevented from flowing out through the gap.

An insulating member for preventing the first cap plate 420*a* from being unintentionally shorted with a component (e.g., electrode assembly 100) accommodated in the case 300 may be disposed on the rear surface of the first cap plate 420*a*. For example, referring to FIG. 3, in the first cap assembly 400*a*, the first cap insulator 440*a* covering the rear surface of the first cap plate 420*a* may correspond to the insulating member (Here, the "rear surface of the first cap plate 420*a*" may refer to a surface of the first cap plate 420*a* opposing the internal space S of the case 300). The first cap insulator 440*a* may include an insulating material, such that short circuit caused by unintentional contact between the first cap plate 420*a* and the electrode assembly 100 may be prevented.

The first cap assembly 400*a* may further include a first fixing member 460*a* coupled to the first rivet 412*a*. The first fixing member 460*a* may be disposed on the rear surface of the first cap plate 420*a* and may be coupled to the end of the first rivet 412*a*. The first fixing member 460*a* may be configured to have a width wider than that of a hole through which the first rivet 412*a* passes in the first cap plate 420*a*. Here, "width" may refer to a length in a direction perpendicular to a first direction (Z-axis direction), which is a direction in which the first rivet 412*a* penetrates the first cap plate 420*a*. The first fixing member 460*a* may be coupled to the end of the first rivet 412*a* penetrating the first cap assembly 400*a* and may prevent components included in the first cap assemblies 400*a* from being separated from each other.

The second cap assembly 400*b* may include a second terminal portion 410*b* electrically connected to the electrode assembly 100 and a second cap plate 420*b* supporting the second terminal portion 410*b*. Also, the second cap assembly 400*b* may further include a second gasket 430*b* blocking a gap between the second rivet and the second cap plate 420*b*. Also, the second cap assembly 400*b* may further include a second cap insulator 440*b* for preventing the second cap plate 420*b* from directly shorting the electrode assembly 100.

The second terminal portion 410*b* of the second cap assembly 400*b* may include a second terminal unit 411*b* and a second rivet 412*b*.

The second terminal unit 411*b* may be disposed on the second cap plate 420*b* and may work as a connection terminal used to electrically connect the battery cell 10 to an external component (e.g., conductive busbar). To this end, the second terminal unit 411*b* may be provided as a plate-shaped member formed of a conductive metal such as aluminum or aluminum alloy. However, the material of the second terminal unit 411*b* is not limited to aluminum.

The second rivet 412*b* may be coupled to the second terminal unit 411*b*. For example, the second rivet 412*b* may penetrate through the second terminal unit 411*b* and may be riveted to the second terminal unit 411*b*. Also, the second rivet 412*b* and the second terminal unit 411*b* may be coupled to each other by laser welding.

The second rivet 412*b* may be disposed to penetrate through both the second terminal unit 411*b* and the second cap plate 420*b* such that ends thereof may oppose the electrode assembly 100. In this case, the first rivet 412*a* may be disposed to oppose one side of the electrode assembly 100, and the second rivet 412*b* may be disposed to oppose the other side opposite to one side of the electrode assembly 100.

The second rivet 412*b* may include a second insertion hole 413*b* configured to allow the connection member 220 to be inserted. The second insertion hole 413*b* may have a shape of a hole penetrating through the second rivet 412*b*. The connection member 220 may be inserted and bonded to the second insertion hole 413*b* of the second rivet 412*b* and may be electrically connected to the second rivet 412*b*.

The second rivet 412*b* may be formed of the same material as the material forming the second terminal unit 411*b*. For example, both the second terminal unit 411*b* and the second rivet 412*b* may be formed of aluminum or aluminum alloy. However, if desired, the second rivet 412*b* may be formed of a material different from that of the second terminal unit 411*b*.

The second cap plate 420*b* may be coupled to the case 300 and may support the second terminal portion 410*b*.

The second cap plate 420*b* may be configured to close the second opening 302 of the case 300. For example, the second cap plate 420*b* may be provided as a plate-shaped member, may be bonded to the case 300 by laser welding or ultrasonic welding and may close the second opening 302. For ease of welding, the second cap plate 420*b* may be formed of the same material as that of the case 300. For example, both the second cap plate 420*b* and the case 300 may be formed of aluminum or aluminum alloy. However, the material included in the second cap plate 420*b* is not limited to the above example, and may be formed of any material which may close the second opening 302 of the case 300 and may stably protect the internal components thereof.

The second gasket 430*b* may be disposed between the second rivet 412*b* and the second cap plate 420*b* and may block the gap between the second rivet 412*b* and the second cap plate 420*b*, such that foreign materials outside the battery cell 10 may be prevented from entering the gap or leakage of the electrolyte in the battery cell 10 may be prevented from flowing out through the gap. Also, the second gasket 430b may include an insulating material (e.g., polymer).

Although not illustrated in the drawing, a second terminal insulator electrically isolating both components from each other may be disposed between the second terminal unit 411b and the second cap plate 420b. However, in embodiments, when it is not necessary to insulate the second terminal unit 411b and the second cap plate 420b from each other, the second terminal insulator may not be provided as illustrated in FIG. 4, and in this case, the second terminal unit 411b and the second cap plate 420b may be in contact with each other.

An insulating member for preventing the second cap plate 420b from being unintentionally shorted with a component (e.g., electrode assembly 100) accommodated in the case 300 may be disposed on the rear surface of the second cap plate 420b. For example, referring to FIG. 4, in the second cap assembly 400b, the second cap insulator 440b covering the rear surface of the second cap plate 420b may correspond to the insulating member (Here, the "rear surface of the second cap plate 420b" may refer to a surface from the second cap plate 420b opposing the internal space S of the case 300). The second cap insulator 440b may include an insulating material, such that the second cap plate 420b may be prevented from being in contact with the electrode assembly 100 and being shorted.

The second cap assembly 400b may further include a second fixing member 460b coupled to the second rivet 412b. The second fixing member 460b may be disposed on the rear surface of the second cap plate 420b and may be coupled to the end of the second rivet 412b. The second fixing member 460b may be configured to have a width wider than a hole through which the second rivet 412b passes in the second cap plate 420b. Here, "width" may refer to a length in a direction perpendicular to a first direction (Z-axis direction), which is a direction in which the second rivet 412b penetrates the second cap plate 420b. The second fixing member 460b may be coupled to the end of the second rivet 412b penetrating the second cap assembly 400b and may prevent components included in the second cap assembly 400b from being separated from each other.

At least one of the plurality of cap assemblies 400a and 400b may include an electrolyte injection port 421 used to inject electrolyte into the case 300. For example, referring to FIGS. 3 and 4, the first cap assembly 400a and the second cap assembly 400b may include an electrolyte injection port 421.

The electrolyte injection port 421 may be provided on cap plates 420a and 420b. For example, the electrolyte injection port 421 may be provided in the shape of a hole passing through the cap plates 420a and 420b.

Corresponding to the electrolyte injection port position of the cap plates 420a and 420b, the avoidance hole 441 may also be provided in the cap insulators 440a and 440b disposed on the rear side the cap plates 420a and 420b. The avoidance hole 441 of the cap insulators 440a and 440b may have a size sufficient not to interfere with electrolyte injection through the electrolyte injection port 421.

After electrolyte injection, the electrolyte injection port 421 may be sealed with a stopper 422. The stopper 422 may be configured to be inserted into the electrolyte injection port 421. The stopper 422 may be fitted into the electrolyte injection port 421. The stopper 422 may block the electrolyte injection port 421 to prevent the electrolyte in the case 300 from leaking out of the battery cell 10.

The electrolyte injection port 421 may be provided in both the first cap assembly 400a and the second cap assembly 400b or in only one cap assembly.

In embodiments, the first cap plate 420a, the first terminal unit 411a, the second cap plate 420b, and the second terminal unit 411b may be formed of the same material, and in this case, the case 300 may also be formed of the same material.

The first terminal portion 410a of the first cap assembly 400a and the second terminal portion 410b of the second cap assembly 400b may have different polarities. For example, in the battery cell 10, the first terminal portion 410a may be electrically connected to negative electrode plates, and the second terminal portion 410b may be electrically connected to positive electrode plates (or vice versa).

Hereinafter, the protective assembly 200 of the battery cell 10 will be described in detail with reference to FIGS. 5 to 7.

Figure 5:
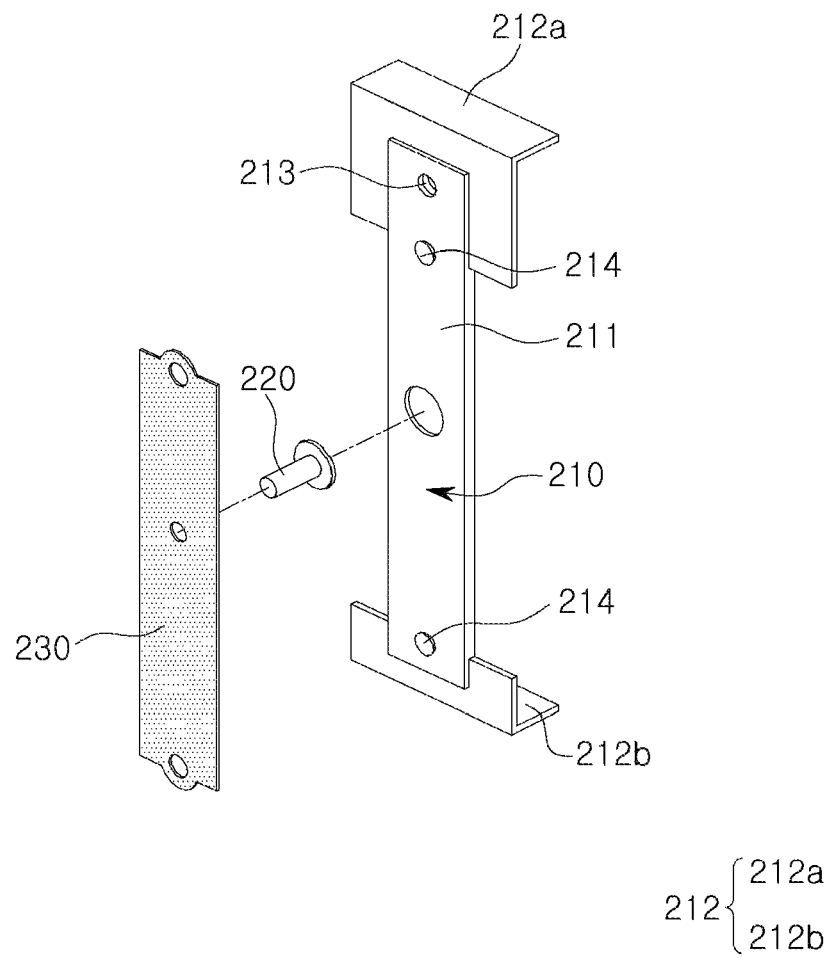
FIG. 5 is an exploded perspective diagram illustrating a protective assembly according to an embodiment of the present disclosure.

FIG. 5 is an exploded perspective diagram illustrating a protective assembly 200 according to an embodiment.

Figure 6:
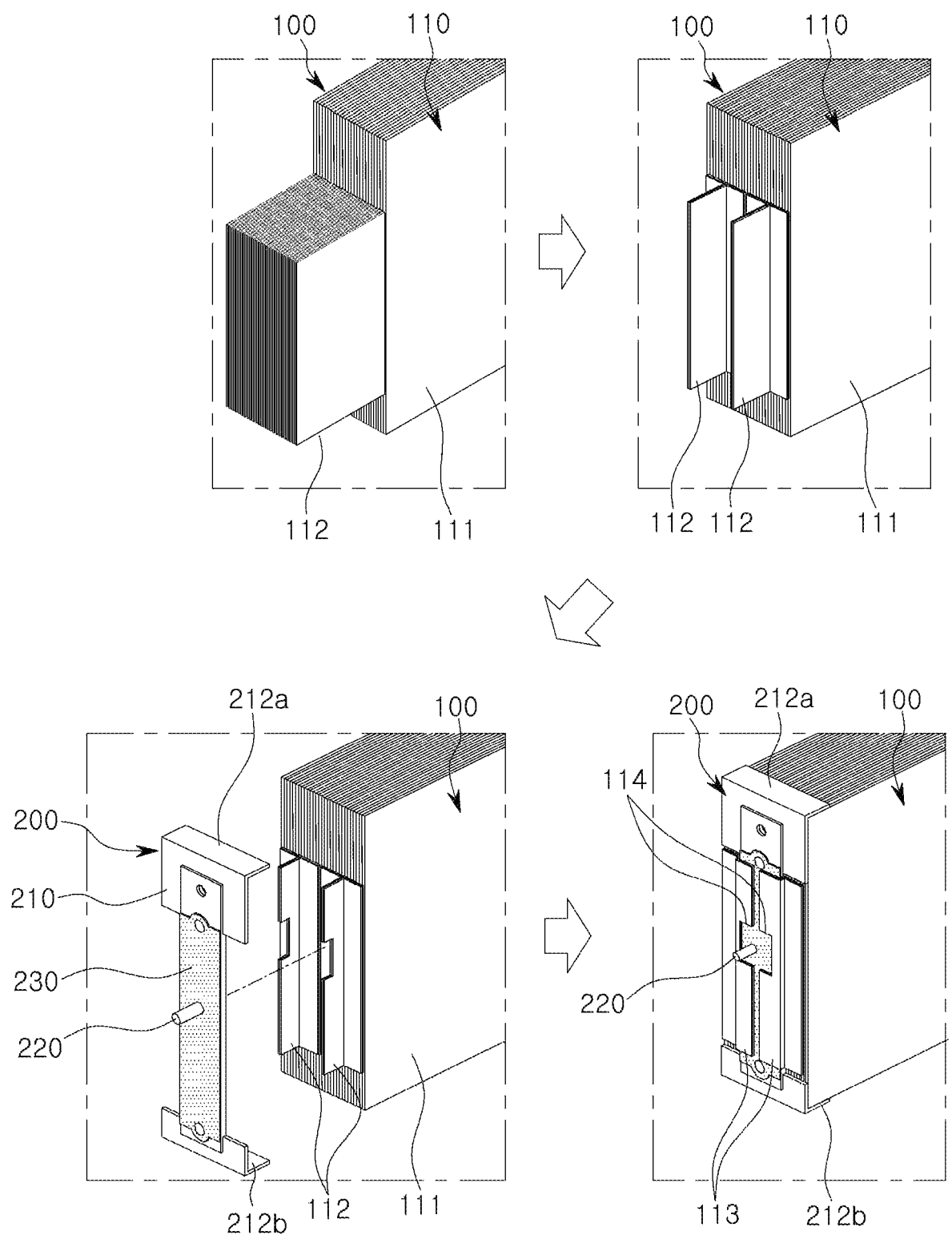
FIG. 6 is a diagram illustrating an example in which an electrode assembly and a protective assembly are coupled to each other according to an embodiment of the present disclosure.

FIG. 6 is a diagram illustrating an example in which an electrode assembly and a protective assembly 200 are coupled to each other according to an embodiment.

Figure 7:
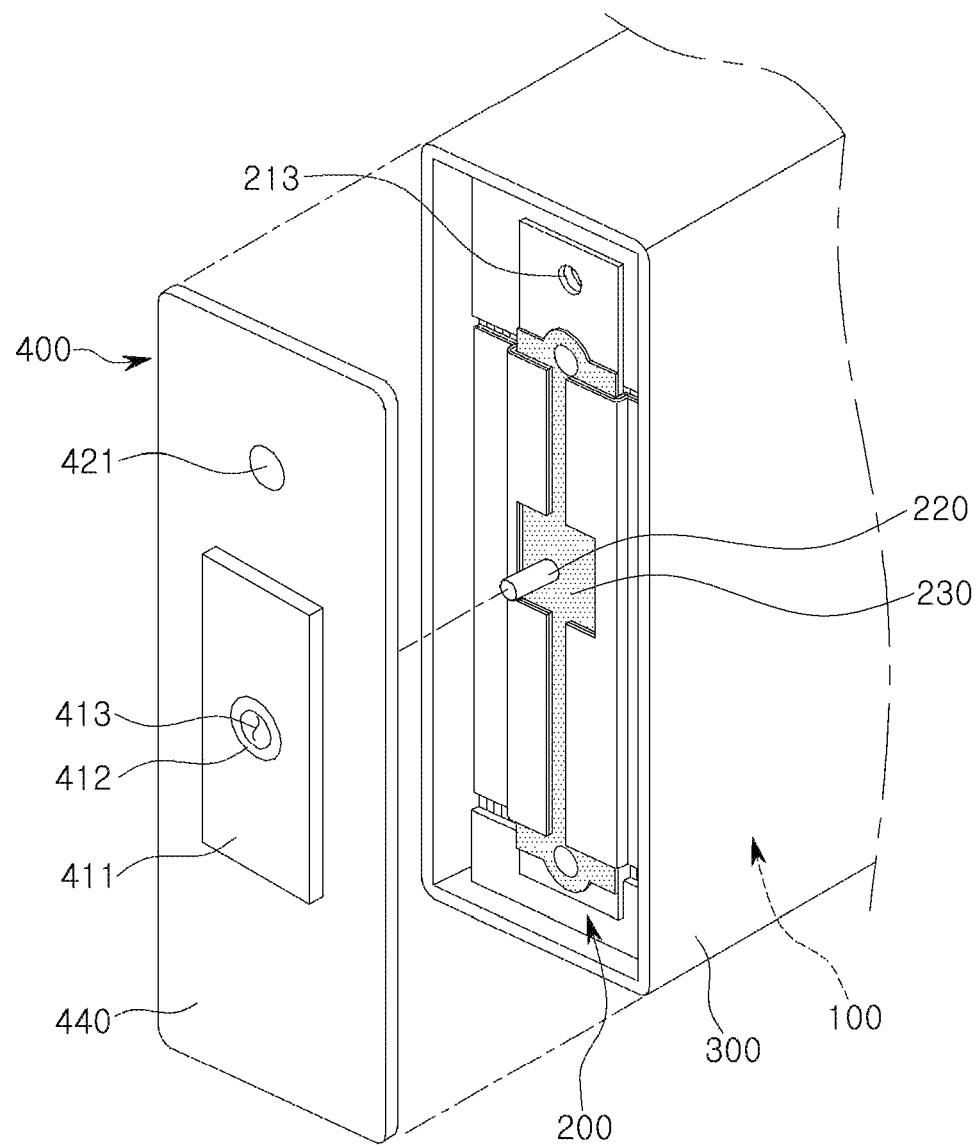
FIG. 7 is a diagram illustrating an example in which a cap assembly and a case are coupled to each other according to an embodiment of the present disclosure.

FIG. 7 is a diagram illustrating an example in which a cap assembly and a case are coupled to each other according to an embodiment.

Since the battery cell and components thereof described with reference to FIGS. 5 to 7 may correspond to the battery cell and components thereof described with reference to FIGS. 1 to 4, overlapping descriptions may not be provided. For example, the protective assembly 200 in FIGS. 5 to 7 may correspond to the protective assembly 200 described with reference to FIGS. 1 and 2.

The protective assembly 200 may include a current collecting member 230 electrically connected to the uncoated portion 112, a connection member 220 protruding from the current collecting member 230, and a protective frame 210 supporting the current collecting member 230 and the connection member 220.

The protective frame 210 may be disposed on at least one side of the electrode assembly and may protect the electrode assembly.

The protective frame 210 may include an impact-absorbing material to prevent the electrode assembly from being damaged by external impacts to the battery cell. Also, the protective frame 210 may include an insulating material to prevent the electrode assembly from being in contact with the case and short-circuiting. Also, the protective frame 210 may include a material not reacting with the electrolyte, and may be stably disposed around the electrode assembly. For example, the protective frame 210 may include a non-conductive metal, plastic, or polymer resin material. Alternatively, the protective frame 210 may include a ceramic filler to which ceramic particles such as zirconia, alumina ($Al_2O_3$), aluminum nitride, boron nitride, silicon nitride, SiC or BeO are applied. However, the material of the protective frame 210 is not limited to the materials mentioned above.

The protective frame 210 may include a body portion 211 to which a current collecting member is coupled, and one or more bent portion 212 extending from the body portion 211 and protecting an edge of an electrode assembly.

The body portion 211 of the protective frame 210 may be disposed to oppose at least a portion of the electrode assembly in the first direction.

The body portion 211 may have a structure having different widths in the height direction such that the uncoated portion of the electrode assembly may penetrate therethrough. Referring to FIG. 5, for example, the width of the upper end and the lower end of the body portion 211 may be wider than the width of the middle end of the body portion 211. By including this structure, the upper end and lower end of the body portion 211 may sufficiently cover and protect one side of the electrode assembly, and also, the uncoated portion of the electrode assembly may come out through the middle end of the body portion 211, such that the protective frame 210 may be in contact with one side of the electrode assembly.

The protective frame 210 may include one or more bent portions 212 connected to the body portion 211. The bent portion 212 may oppose at least a portion of the electrode assembly 100 in a second direction different from the first direction. For example, the second direction may be a direction perpendicular to the first direction.

Referring to FIG. 5, the protective frame 210 may include a first bent portion 212a extending from one side of the body portion 211 and a second bent portion 212b extending from the other side of the body portion 211. For example, the first bent portion 212a and the second bent portion 212b may extend from both ends of the body portion 211 in a direction perpendicular to the body portion 211.

The body portion 211 and the first bent portion 212a may cover at least a portion of one side edge of the electrode assembly. The body portion 211 and the first bent portion 212a may cover at least a portion of another side edge of the electrode assembly.

The current collecting member 230 may be coupled to the protective frame 210. The current collecting member 230 may be supported by the protective frame 210 and may be stably connected to the electrode assembly.

The current collecting member 230 may be configured as a plate-shaped member including a conductive metal, may be electrically connected to the uncoated portion 112 of the electrode assembly 100 and may become a passage for a current flow between the electrode assembly 100 and the terminal portion 410.

The current collecting member 230 may be fixed to the front surface of the body portion 211 of the protective frame 210. Here, the front surface of the body portion 211 may refer to a surface opposing the cap assembly 400 from the body portion 211. Various coupling methods may be applied to the coupling between the current collecting member 230 and the protective frame 210. For example, a coupling protrusion 214 configured to penetrate through the current collecting member 230 may be provided in the body portion 211, and the coupling protrusion 214 may be thermally fused while penetrating through the current collecting member 230 and the coupling protrusion 214 may fix the current collecting member. Alternatively, the current collecting member 230 and the body portion 211 may be fixed to each other by a bonding material such as a bonding binder.

The current collecting member 230 may include a material having a degree of mechanical strength greater than that of a material included in the protective frame 210. For example, the protective frame 210 may include a plastic or resin material, and the current collecting member 230 may include a conductive metal material.

As the current collecting member 230 including a metallic material is coupled to the protective frame 210, structural rigidity may be further increased as compared to the example in which each of the protective frame 210 and the current collecting member 230 are disposed alone.

Also, the protective frame 210 covering one side of the electrode assembly 100 may stably support the current collecting member 230, such that the electrical connection between the current collecting member 230 and the electrode assembly 100 may be stably maintained.

Also, as the current collecting member 230 is fixed to the protective frame 210, the relative position with the electrode assembly may also be fixed, such that the ease of connection between the electrode assembly 100 and the current collecting member 230 may be increased.

The protective frame 210 may be disposed to cover a portion of the surface of the current collecting member 230. Accordingly, the current collecting member 230 may be connected to the uncoated portion 112 only in a specific portion.

The connection member 220 may be configured to protrude from one surface of the current collecting member 230 toward the periphery of the electrode assembly 100. For example, the connection member 220 may be provided as a pin-shaped structure penetrating the current collecting member 230, and at least a portion may be disposed to protrude from one surface of the current collecting member 230 in the first direction, which is the direction in which the cap assembly 400 is assembled.

At least a portion of the connection member 220 may be in contact with the current collecting member 230, and the other portion may be in contact with the terminal portion 410 of the cap assembly 400.

The connection member 220 may include a conductive material and may electrically connect the current collecting member 230 to the terminal portion 410 of the cap assembly 400.

When a plate-shaped member is disposed on one side of the electrode assembly 100, the flow of the electrolyte in the case 300 may be hindered.

To prevent this, the protective assembly 200 according to the embodiment may include a through-hole 213 configured to allow electrolyte to pass therethrough. For example, referring to FIGS. 5 and 7, the through-hole 213 of the protective frame 210 may be configured to have a form of hole penetrating the body portion 211 and extending from one surface of the protective frame 210 to the other surface of the protective frame 210.

During the process of manufacturing the battery cell 10, at least a portion of the electrolyte injected from the outside of the case may flow into the electrode assembly 100 through the through-hole 213 of the protective frame 210. That is, the through-hole 213 of the protective frame 210 may allow the electrolyte to be smoothly injected.

The through-hole 213 of the protective assembly 200 may be disposed to oppose the electrolyte injection port 421 of the cap assembly 400. For example, the through-hole 213 and the electrolyte injection port 421 may oppose each other in the first direction, which is the direction of coupling between the cap assembly 400 and the case 300.

As the through-hole 213 is disposed in the protective assembly 200, the electrolyte flowing from the electrolyte injection port 421 may pass through the through-hole 213 and may smoothly flow into the case 300.

FIG. 6 may illustrate processes in which the electrode assembly 100 and the protective assembly 200 are connected to each other in sequence in the process of manufacturing the battery cell 10.

Referring to the left upper end in FIG. 6, the electrode assembly 100 may include a plurality of electrode plates 110 stacked in one direction. At least one of the plurality of electrode plates 110 may include a coated portion 111 coated with an active material and an uncoated portion 112 not coated with an active material. In the process of stacking or winding the plurality of electrode plates 110, the uncoated portions 112 may be aligned side by side in a predetermined position.

The uncoated portion 112 may be electrically connected to the terminal portions 410a and 410b of the cap assemblies 400a and 400b through the protective assembly 200, and may become a passage for a current flow between the electrode assembly 100 and the terminal portions 410a and 410b.

In the electrode assembly 100, the uncoated portions 112 may be configured to extend from one side of the coated portion 111. In this case, the uncoated portions of the positive electrode plate may be disposed side by side on one side of the electrode assembly 100, and the uncoated portions of the negative electrode plate may be arranged side by side on the other side opposite to one side of the electrode assembly 100. For example, the entirety of the uncoated portions 112 illustrated in the left upper end in FIG. 6 may have the same polarity.

Referring to the right upper end in FIG. 6, the uncoated portions 112 having the same polarity may be connected to and in contact with each other. If desired, at least a portion of the uncoated portions 112 may be folded to be in contact with other adjacent uncoated portions 112.

Referring to the left lower end in FIG. 6, the uncoated portions 112 having the same polarity may be bundled together and may form a plurality of aggregates, and the protective assembly 200 may be seated and assembled between the aggregates of the uncoated portions 112. In the protective assembly 200, at least a portion of the protective frame 210 may oppose the electrode assembly 100 in the first direction, and the first bent portion 212a and the second bent portion 212b of the protective frame 210 may be disposed to cover different edges of the electrode assembly 100, respectively. Here, the first direction may be a direction in which the uncoated portion 112 extends from the coated portion 111 of the electrode assembly 100.

After the protective assembly 200 is seated, the current collecting member 230 of the protective assembly 200 may be electrically connected to the uncoated portion 112.

Referring to the right lower end in FIG. 6, at least a portion of the uncoated portion 112 may be bent to form the bonding portion 113, and the bonding portion 113 may cover at least a portion of the front surface of the current collecting member 230. Here, the front surface of the current collecting member 230 may refer to a surface of the current collecting member 230 opposing the cap assembly 400.

The bonding portion 113 of the uncoated portion 112 and the current collecting member 230 may be electrically connected to each other. For example, the bonding portion 113 of the uncoated portion 112 and the current collecting member 230 may be welded to be in contact with each other and may be electrically connected.

The welding process may be performed through the front surface of the bonding portion 113 in a state in which the bonding portion 113 covers the front surface of the current collecting member 230. In this case, since the current collecting member 230 is disposed on the rear surface of the bonding portion 113, damages to the internal region of the electrode assembly 100 may be prevented by welding.

A laser welding method may be applied to the bonding of the uncoated portion and the connection unit. However, any bonding method may be applied as long as the method may electrically connect the uncoated portion to the connection unit in addition to laser welding.

The uncoated portion 112 of the electrode assembly 100 may include an avoidance portion 114 for avoiding interference with the connection member 220. For example, referring to FIG. 6, a portion of the uncoated portion 112 may be cut to form an avoidance portion 114, and accordingly, in the process of bending the uncoated portion 112 to cover at least a portion of the protective assembly 200, interference with the connection member 220 may be prevented.

The electrode assembly 100 connected to the protective assembly 200 may be accommodated in the case 300 and may be electrically connected to the terminal portions 410a and 410b of the cap assemblies 400a and 400b. For example, referring to FIG. 7, in a state in which electrode assembly 100 is accommodated in case 300, the cap assembly 400 may be assembled to the case 300, and in this process, the connection member 220 may be inserted into the terminal portions 410a and 410b of the cap assemblies 400a and 400b. The cap assembly 400 illustrated in FIG. 7 may correspond to one of the first cap assembly 400a or the second cap assembly 400b illustrated in FIGS. 1 to 4.

As the cap assembly 400 is coupled to the case 300, the electrode assembly 100 to the current collecting member 230, the connection member 220 and the terminal portions 410a and 410b may be electrically connected.

Hereinafter, components of the cap assembly 400 on side of the battery cell will be described with reference to FIGS. 8 to 10 in view of cross-sectional surfaces thereof.

Figure 8:
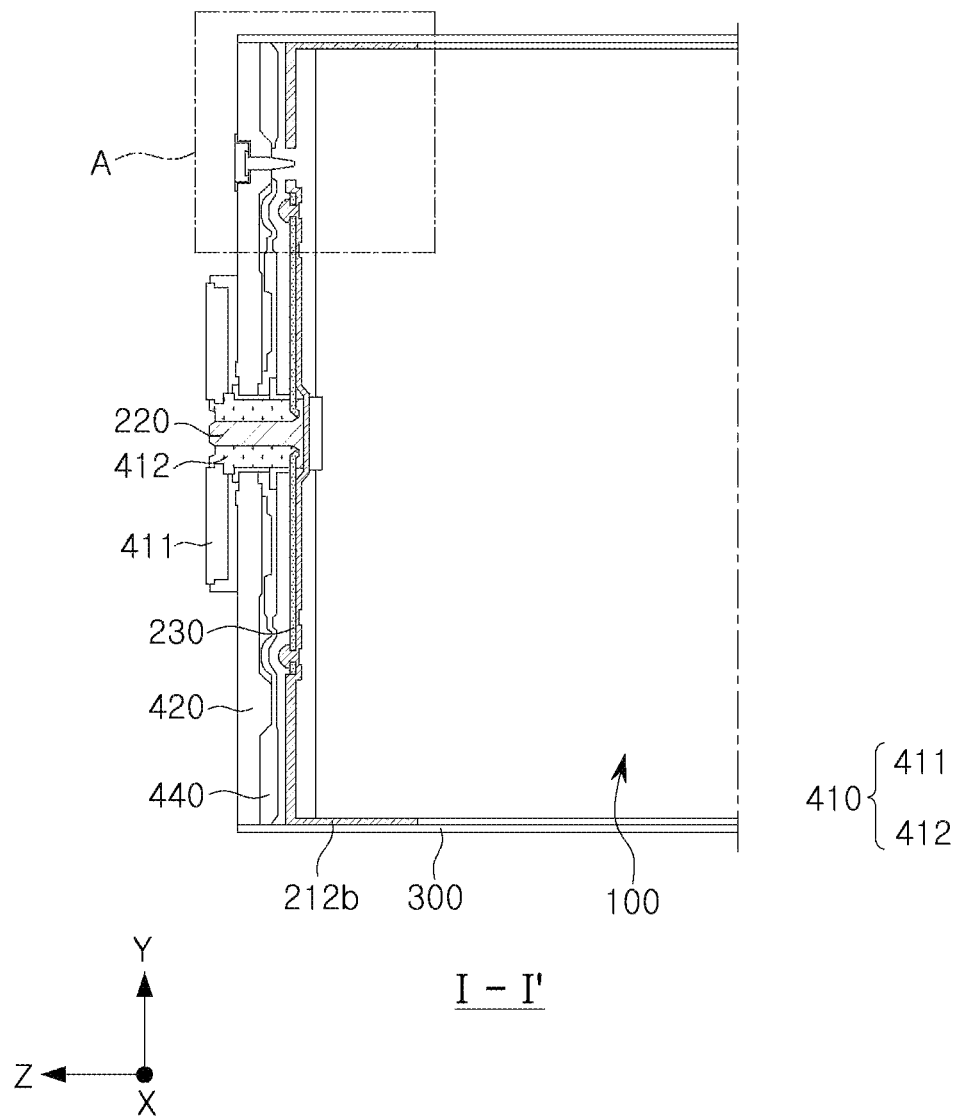
FIG. 8 is a cross-sectional diagram taken along line I-I' in FIG. 1.

FIG. 8 is a cross-sectional diagram taken along line I-I' in FIG. 1.

Figure 9:
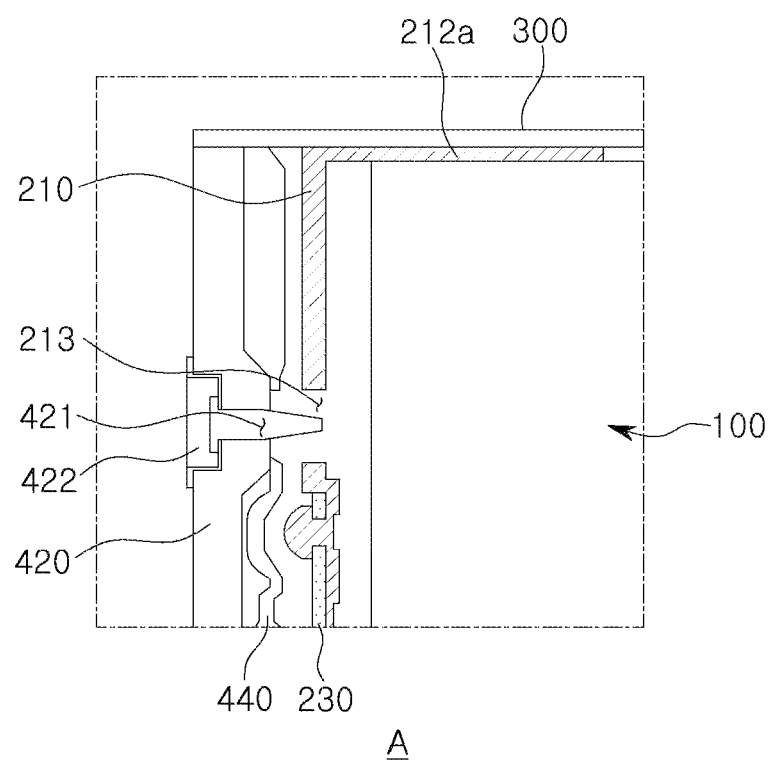
FIG. 9 is an enlarged diagram illustrating portion A in FIG. 8.

FIG. 9 is an enlarged diagram illustrating portion A in FIG. 8.

Figure 10:
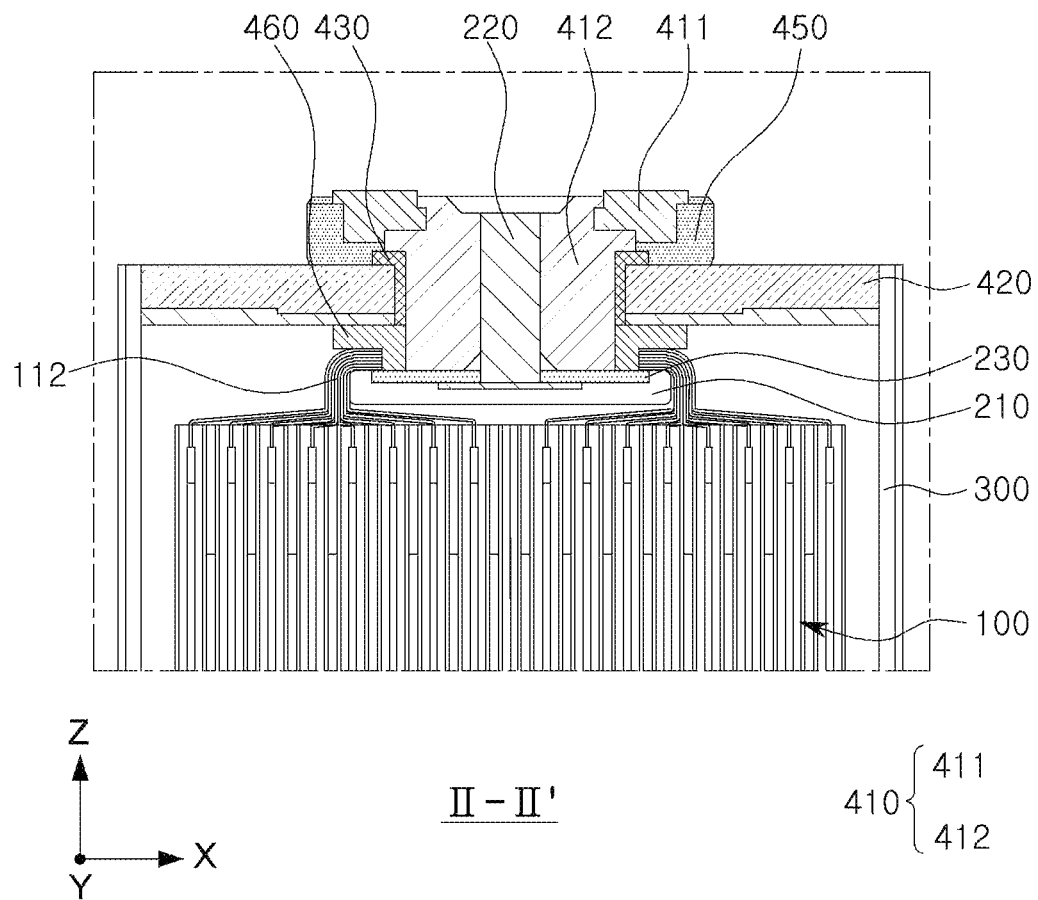
FIG. 10 is a cross-sectional diagram taken along line II-IF in FIG. 1.

FIG. 10 is a cross-sectional diagram taken along line II-IF in FIG. 1.

Since the battery cell 10 and components thereof described with reference to FIGS. 8 to 10 may correspond to the battery cell 10 and components thereof described in the aforementioned example embodiments with reference to FIGS. 1 to 7, overlapping descriptions may not be provided. For example, the cap assembly 400 described with reference to FIGS. 8 to 10 may correspond to one of the first cap assembly 400a or the second cap assembly 400b described with reference to FIGS. 1 to 7.

The cap assembly 400 of the battery cell 10 may be coupled to the case 300 along the first direction (Z-axis direction), and accordingly, the terminal portion 410a of the cap assembly 400 may be electrically connected to the electrode assembly 100 through the connection member 220.

The protective assembly 200 may include a current collecting member 230 electrically connected to the uncoated portion 112 of the electrode assembly 100, a connection member 220 electrically connected to the current collecting member 230, and a protective frame 210 covering at least a portion of the current collecting member 230.

The connection member 220 may penetrate through the current collecting member 230 and may extend in a direction toward the cap assembly 400.

The connection member 220 may be provided as a separate member assembled to the current collecting member 230, or may be integrated with the current collecting member 230.

The current collecting member 230 and the connection member 220 may be formed of the same material as the material forming the uncoated portion 112 connected to the current collecting member 230. For example, when the uncoated portion 112 connected to the current collecting member 230 is formed of copper or a copper alloy, the current collecting member 230 and the connection member 220 may be formed of the same copper or copper alloy. Alternatively, when the uncoated portion 112 connected to the current collecting member 230 is formed of aluminum or an aluminum alloy, the current collecting member 230 and the connection member 220 may be formed of the same aluminum or aluminum alloy. However, the materials of the current collecting member 230 and the connection member 220 are not limited to the materials mentioned above, and may be formed of a material different from that of the uncoated portion 112 connected to the current collecting member 230, for example.

The protective frame 210 may include an insulating material and may be disposed between the current collecting member 230 and the uncoated portion 112. The protective frame 210 may cover a partial surface (e.g., rear surface) of the current collecting member 230 such that the current collecting member 230 may be connected to the uncoated portion 112 only in a specific portion.

The terminal portion 410a of the cap assembly 400 may be electrically connected to the connection member 220.

The terminal portion 410a may include a terminal unit 411 exposed externally of the cap assembly 400 and a rivet 412 coupled to the terminal unit 411.

The rivet 412 may include an insertion hole 413 into which the connection member 220 is inserted. The connection member 220 may be welded while being inserted into the insertion hole 413. For example, while the connection member 220 is inserted into the insertion hole 413, the upper end may be exposed from the battery cell 10, and through this portion, the connection member 220 and the contact portion of the rivet 412 may be welded and bonded to each other.

The width of the insertion hole 413 of the rivet 412 may have a size corresponding to the thickness of the connection member 220.

The rivet 412 may further include a guide groove for guiding an insertion position of the connection member 220. For example, the guide groove may have the shape of an inclined surface formed at the entrance of the insertion hole 413. Accordingly, even when the insertion hole 413 has a size fitting the connection member 220, the upper end of the connection member 220 may be easily inserted into the insertion hole 413 along the inclined surface of the guide groove, thereby increasing ease of assembly.

An end of the rivet 412 may be inserted into the avoidance portion 114a provided to avoid the connection member 220 in the uncoated portion 112. For example, in a state in which the cap assembly 400 is coupled to the case 300, an end of the rivet 412 may be disposed adjacent to the current collecting member 230 exposed through the avoidance portion 114a. By including this structure, the cap assembly 400 and the electrode assembly 100 may be in closer contact with each other such that space efficiency may be increased.

In embodiments, the material forming the rivet 412 may be the same as the material forming the connection member 220 inserted into the rivet 412. For example, when the connection member 220 includes copper, the rivet 412 may also include copper. As the rivet 412 and the connection member 220 are formed of the same material, easiness and reliability of welding between the rivet 412 and the connection member 220 may be further increased.

In this case, a material forming the rivet 412 and a material forming the terminal unit 411 may be different from each other. For example, the rivet 412 may include copper or may be formed by plating nickel on copper, and the terminal unit 411 may include aluminum.

As the connection member 220 is connected to the terminal unit 411 via the rivet 412 formed of the same material, the ease of connection and the reliability of the connection may be increased as compared to the example in which the connection member 220 is directly connected to the terminal unit 411 formed of a different material.

That is, the rivet 412 directly connected to the connection member 220 may be formed of the same material as that of the connection member 220, and the terminal unit 411 may be formed of a material different from that of the rivet 412 and the connection member 220, such that the degree of freedom in selecting the material of the terminal portion 410 may be increased, and connection easiness and connection stability may be assured.

The through-hole 213 of the protective assembly 200 may be disposed to oppose the electrolyte injection port 421 of the cap assembly 400. For example, referring to FIGS. 8 and 9, the through-hole 213 and the electrolyte injection port 421 may oppose each other in the first direction (Z-axis direction).

The electrolyte injected into the case through the electrolyte injection port provided on the cap plate may pass through the through-hole 213 of the protective frame 210 and may flow into the electrode assembly.

After the injection of the electrolyte is completed, the electrolyte injection port may be closed by the stopper 422. As illustrated in FIGS. 8 and 9, one side end of the stopper 422 may pass through the electrolyte injection port and may reach the through-hole 213 of the protective frame 210. However, the specific shape of the stopper 422 is not limited to the example illustrated in the drawing.

The shape and size of the electrolyte injection port and through-hole 213 may be varied. For example, through-hole 213 may be formed to have a size equal to or larger than the electrolyte injection port. For example, the through-hole 213 may have the shape of a circular hole or an elliptical hole or a slit.

If desired, a plurality of electrolyte injection ports and a plurality of through-holes 213 may be provided. For example, the plurality of through-holes 213 may be provided in a portion of the protective frame 210 opposing an electrolyte injection port.

In the drawing, the through-hole 213 has the shape of a hole penetrating in the first direction (Z-axis direction), but this is merely an example, and the specific shape of the through-hole 213 may be different from the illustrated example. For example, the through-hole 213 may have the shape of a hole having a path extending in a direction inclined to the first direction, or a shape of a hole having a path bent more than once from one surface of the protective frame 210 to the other surface.

In embodiments, the battery cell 10 may include a protective assembly 200 disposed on at least one side of the electrode assembly 100 and may safely protect the electrode assembly from impacts applied to the battery cell 10.

Also, the protective assembly 200 may include an insulating material and a material not reacting to the electrolyte, thereby preventing the electrode assembly 100 from being unintentionally shorted with the case 300.

Also, by including a current collecting member including a metal material, the protective assembly 200 may be used as a protective structure having a high degree of structural rigidity.

Also, the protective assembly 200 may include a connection member 220 configured to be inserted into the terminal portion 410 of the cap assembly 400, such that the electrode assembly 100 and the terminal portion 410 may be simply and stably connected to each other, and a space for connecting the electrode assembly 100 to the terminal portion 410 may be reduced, such that energy density of the battery cell 10 may be increased.

According to the aforementioned example embodiments, the battery cell may safely protect the electrode assembly from external impacts.

Also, in the battery cell, electrolyte may be effectively injected even when a protective structure is disposed in the cap assembly.

Also, the battery cell may include a connection member in which at least a portion is inserted into the terminal portion, wasted space in the case may be reduced, thereby increasing energy density.

Also, as the battery cell is electrically connected to the connection member and the terminal portion during the process of assembling the cap assembly to the case, the assembly process may be simplified.

Only specific examples of implementations of certain embodiments are described. Variations, improvements and enhancements of the disclosed embodiments and other embodiments may be made based on the disclosure of this patent document.

What is claimed is:

1. A battery cell, comprising:
an electrode assembly in which a plurality of electrode plates are stacked, and the electrode assembly includes a coated portion coated with an active material and uncoated portion not coated with an active material;
a protective assembly disposed on at least one side of the electrode assembly and including an insulating material;
a case having an internal space in which the electrode assembly is accommodated, and
a cap assembly coupled to the case to close the internal space and facing the electrode assembly,
wherein the protective assembly includes:
a current collecting member disposed between the cap assembly and the electrode assembly and electrically connected with the electrode assembly, and includes a first surface facing the cap assembly; and
a protective frame disposed between the current collecting member and the electrode assembly, and supports the current collecting member,
wherein at least a portion of the uncoated portion protrudes toward the cap assembly and is bent to form a bonding portion,
wherein the bonding portion is disposed between the cap assembly and the current collecting member, and configured to contact in the first surface of the current collecting member.

2. The battery cell of claim 1,
wherein the protective assembly includes a through-hole configured to allow electrolyte to pass therethrough, and
wherein the cap assembly include an electrolyte injection port configured to allow the electrolyte to be injected.

3. The battery cell of claim 2, wherein the through-hole of the protective assembly is disposed to oppose the electrolyte injection port provided in the cap assemblies, and communicated with the electrolyte injection port.

4. The battery cell of claim 1, wherein the through-hole is configured to extend from one surface of the protective frame to the other surface of the protective frame.

5. The battery cell of claim 1, wherein the protective frame includes:

a body portion opposing the electrode assembly in a first direction; and
one or more bent portions extending from the body portion and opposing the electrode assembly in a second direction perpendicular to the first direction.

6. The battery cell of claim 5, wherein the through-hole is disposed in the body portion and opposes the electrolyte injection port in the first direction.

7. The battery cell of claim 5,
wherein the one or more bent portions include a first bent portion and a second bent portion spaced apart from each other, and
wherein at least a portion of the electrode assembly is disposed between the first bent portion and the second bent portion.

8. The battery cell of claim 2,
wherein the case includes a first opening and a second opening spaced apart from each other, and
wherein the cap assembly include a first cap assembly closing the first opening and a second cap assembly closing the second opening.

9. A battery cell, comprising:
an electrode assembly in which a plurality of electrode plates are stacked;
a case having an internal space in which the electrode assembly is accommodated;
a cap assembly coupled to the case and having a terminal portion disposed thereon; and
a protective assembly disposed between the electrode assembly and the cap assembly and protecting the electrode assembly,
wherein the protective assembly includes:
a current collecting member electrically connected with the electrode assembly, and disposed between the cap assembly and the electrode assembly;
a connection member disposed to electrically connect the current collecting member and the terminal portion; and
a protective frame includes an insulating material and supports the current collecting member and the connection member,
wherein the connection member protrudes toward the cap assembly,
wherein the electrode assembly further includes an uncoated portion not coated with an active material and contact with the current collecting member, and
wherein a portion of the uncoated portion is cut to form an avoidance portion for avoiding interference with the connection member.

10. The battery cell of claim 9, wherein the protective assembly includes a protective frame disposed to oppose the cap assembly and including an insulating material,
wherein the protective assembly covers at least one side edge of the electrode assembly.

11. The battery cell of claim 10, wherein the protective frame includes:
a body portion opposing the electrode assembly in a first direction; and
one or more bent portions connected to the body portion and opposing the electrode assembly in a second direction perpendicular to the first direction.

12. The battery cell of claim 11, wherein the body portion of the protective frame includes a through-hole through which the electrolyte solution passes.

13. The battery cell of claim 12,
wherein the cap assembly includes a cap plate including an electrolyte injection port, and wherein the through-hole of the protective frame is disposed to oppose the electrolyte injection port.

14. The battery cell of claim 9,
wherein the connection member disposed between the current collecting member and the protective frame, and penetrates the current collecting member,
wherein at least a portion of the connection member is inserted into the terminal portion.

* * * * *